(12) United States Patent
Lee

(10) Patent No.: US 10,307,670 B2
(45) Date of Patent: Jun. 4, 2019

(54) MOTORCYCLE SIMULATION CONTROLLER

(71) Applicant: Ju-Yup Lee, Arlington, VA (US)

(72) Inventor: Ju-Yup Lee, Arlington, VA (US)

( * ) Notice: Subject to any disclaimer, the term of this patent is extended or adjusted under 35 U.S.C. 154(b) by 0 days.

(21) Appl. No.: 15/620,775

(22) Filed: Jun. 12, 2017

(65) Prior Publication Data
US 2018/0353851 A1 Dec. 13, 2018

(51) Int. Cl.
*A63F 9/00* (2006.01)
*A63F 13/245* (2014.01)
*A63F 13/211* (2014.01)

(52) U.S. Cl.
CPC .......... *A63F 13/245* (2014.09); *A63F 13/211* (2014.09)

(58) Field of Classification Search
None
See application file for complete search history.

(56) References Cited

U.S. PATENT DOCUMENTS

| | | | | |
|---|---|---|---|---|
| 6,251,015 | B1 * | 6/2001 | Caprai | A63F 13/06 273/148 B |
| 2007/0072662 | A1 * | 3/2007 | Templeman | A63F 13/00 463/6 |
| 2008/0146302 | A1 * | 6/2008 | Olsen | A63F 13/213 463/7 |
| 2009/0191967 | A1 * | 7/2009 | Konishi | A63F 13/06 463/37 |
| 2011/0053691 | A1 * | 3/2011 | Bryant | A63F 13/211 463/37 |
| 2014/0361956 | A1 * | 12/2014 | Mikhailov | A63F 13/00 345/8 |
| 2016/0175702 | A1 * | 6/2016 | Black | A63F 13/28 463/31 |
| 2016/0300390 | A1 * | 10/2016 | Malafeew | A63F 13/245 |
| 2017/0103160 | A1 * | 4/2017 | Hynes | G06F 17/5095 |

OTHER PUBLICATIONS

Fajans, J. Steering in bicycles and motorcycles. Am. J. Phys. 68-71, Jul. 2000.

* cited by examiner

*Primary Examiner* — Seng Heng Lim
(74) *Attorney, Agent, or Firm* — Brian Inacay

(57) ABSTRACT

The subject matter of the disclosure relates generally to motorcycle simulation video game controllers. A motorcycle simulation controller is disclosed. The controller can be utilized for determining the center of gravity of a player character. A motorcycle simulation controller is disclosed. The controller can be utilized for determining the center of gravity of a player character.

20 Claims, 5 Drawing Sheets

MOTORCYCLE SIMULATION CONTROLLER

FIELD

The described embodiments relate generally to video game controller systems. More particularly, the present embodiments relate to methods and apparatus for controlling a motorcycle video game simulation. The disclosed motorcycle video game controller system includes a hand-held controller, a head unit, and a means for determining a position of the head unit relative to the hand-held controller. Motorcycle simulation programs can then utilize position of the head unit to the hand-held controller as an input in the game. By providing the position of the head unit relative to the hand-held controller, the controller system allows for motorcycle specific maneuvers such as countersteering and other maneuvers that require a weight shift in order to execute.

BACKGROUND

Realistic automobile racing video games and simulators have become very popular among automobile enthusiasts and gamers alike. Unfortunately, a system that allows for similar realism and cost does not exist for motorcycles. Furthermore, because motorcycle physics are inherently different that of automobiles, similar techniques for achieving realism in automobile games do not apply to motorcycle games. For example, various techniques for controlling motorcycles, such as weight shifting during turning maneuvers, are impossible to practice on automobiles and vice versa. Further, operating a motorcycle involves a greater degree and type of rider input relative to operating automobiles. A key factor in a car's handling is modulating the balance between front and rear tire traction levels. The driver can manipulate the center of mass of the vehicle by increasing or decreasing the rate of acceleration by modulating the throttle input. For example, increasing the rate of acceleration and thereby shifting the center of gravity to the rear of the automobile decreases traction on the rear wheels thereby causing the automobile to understeer. Single track vehicles, particularly motorcycles, exhibit dynamics that are inherently different than the dynamics of other vehicles such as automobiles because of the gyroscopic effects a single track vehicle experiences. For example, modulating the throttle input to shift the center of mass to the rear of a motorcycle does not cause the motorcycle to understeer.

By way of contrast, a motorcycle driver uses other tools to manipulate a motorcycle's turning characteristics. One tool a motorcycle driver has is the use of his body positioning. Given that a motorcycle driver makes up a significant mass compared to the motorcycle, the motorcycle driver can shift their weight forward and backward to modulate traction on a given wheel or side to side to affect a lean angle. Body positioning on a motorcycle is a critical component of modern performance motorcycle driving. Another tool a motorcycle uses involves utilizing the gyroscopic momentum of the wheels as in the countersteering technique. An additional discussion of the different physics behind the two vehicle steering methods can be found in J. Fajans "Steering in bicycles and motorcycles" (incorporated by reference and available at http://socrates.berkeley.edu/~fajans/pub/pdf-files/SteerBikeAJP.PDF (accessed 6 May 2017)).

SUMMARY

This paper describes various embodiments that relate to a motorcycle video game simulation controller system.

A motorcycle simulation controller is disclosed. The controller can be utilized for determining the center of gravity of a player character. A hand-held controller can be included with the motorcycle simulation controller where the hand-held controller can measure a steering angle. Additionally, a head tracker can be included. The head tracker can measure a positional location of the head tracker relative to the hand-held controller. Further the simulation can utilize the positional location to determine an effective lean angle of a virtual motorcycle. Finally, the motorcycle simulation controller can include a positional sensor that can detect the location of the helmet relative to the controller. The simulation can utilize the relative position of the helmet to the controller in order to determine a center of gravity.

A single track vehicle simulation controller is disclosed. The single track vehicle simulation controller includes a hand-held controller. The simulation controller can also include a head unit. Finally, the simulation controller can include an optical sensor. The optical sensor can detect the position of the head unit relative to the hand-held controller.

A method of controlling a motorcycle video game simulation is disclosed. The method can include one step of turning a hand-held controller in a direction opposite to a desired turn. The next step can include providing a first center of gravity. Another step can include determining a first position of a helmet controller. A further step can include translating the helmet controller in the direction of the desired turn. Another step can include determining a second position of the helmet controller. A center of gravity based on the delta between the first position and the second position can be determined. Finally, combining the second center of gravity with a reference center of gravity of a motorcycle can determine a combined center of gravity.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
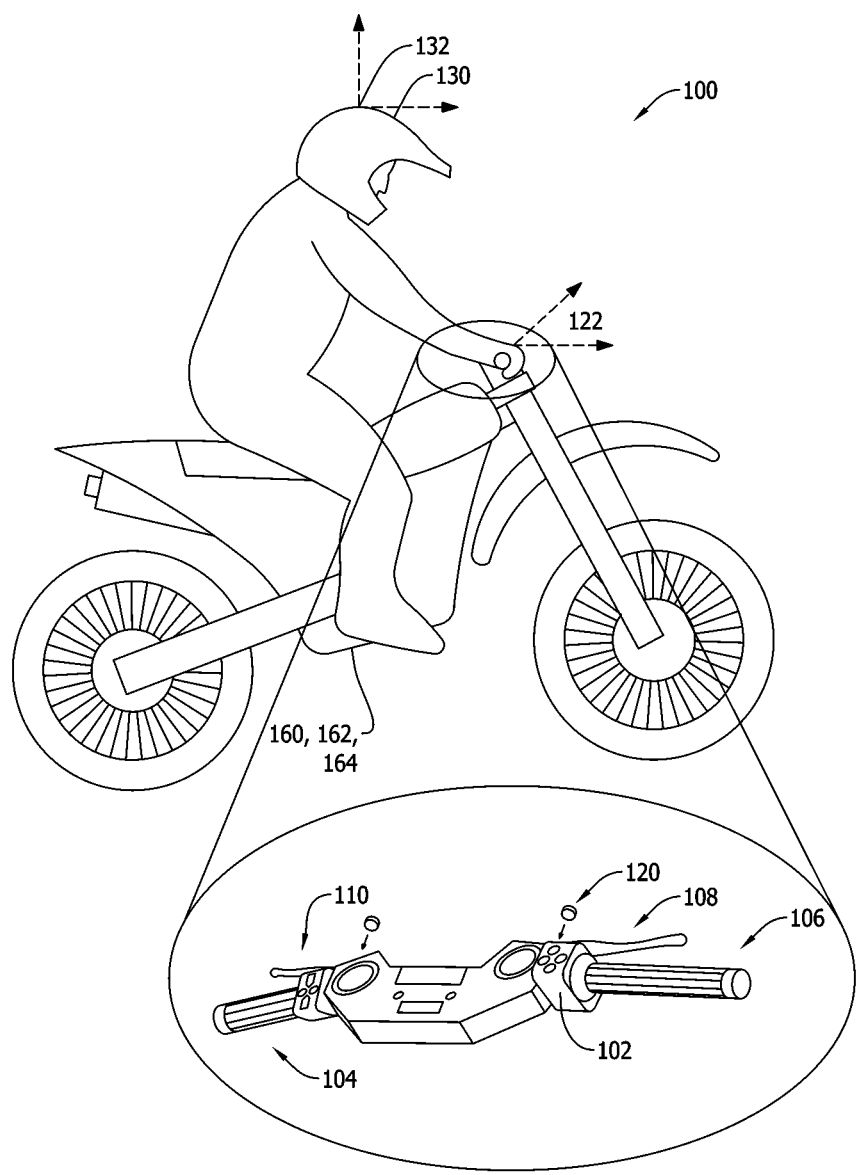
FIG. 1 depicts a perspective view of an exemplary video game simulation controller system.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Existing methods of user input to video game simulations generally limit certain design objectives such as realism or the authentic replication of driving techniques. In many cases, user input devices for video game simulations involve a generic computer human input device such as a mouse, a game controller, or a keyboard; and in some cases, the user input devices may bear little resemblance to the real life equivalent of the video game simulation. One way to meet video game design objectives such as the goal of making a video game simulation more realistic is to utilize more specialized user input devices such as a wheel type input device combined with a pedal type input device for the case of vehicle simulations. Unfortunately, the aforementioned specialized input devices can be expensive and difficult to operate. For example, arcade machine controllers adapted for automobile video game simulations may in addition to requiring specialized hardware also take up a large amount of space. Furthermore, in some applications, use of specialized user input devices suitable for some types of vehicle simulations may not be suitable for other types of vehicle simulations. Moreover, physical characteristics of certain vehicles such as motorcycles are inherently different than other vehicles such as automobiles.

One solution to this issue is to utilize the position of a video game simulation player's head in addition to a wheel type control unit. In some embodiments, the system can include a controller unit capable of measuring inputs from the player and a helmet unit capable of sensing the position of the player's head in relation to the control unit. In other embodiments, the helmet unit can take the form of a helmet worn on the head of the player. The helmet unit can additionally include a positioning unit located outside of the operator's body. The helmet unit can include a sensor, such as an optical sensor that communicates with the positioning unit. The optical sensor, in communicating with the positioning unit can then determine, based on the location of the optical sensor relative to the receiving unit the angle at which the operator's body is located relative to the ground, the controller unit, or any fixed position such as the ground. In certain embodiments, the layout of the sensors can also be reversed.

In other embodiments, the control unit can include a handlebar section which can include a throttle, brake lever, clutch lever, and other controls designed to replicate the hand-controls of a motorcycle. In certain embodiments, the control unit can also include a pedal unit which can include such a gear shifter and a brake lever. For example, the control unit can include a hand unit accessible by the user's hand and a foot unit accessible by the user's feet. The hand unit can also include sensors, optical reflectors, or other means to report the position and rotation of the hand unit. The head unit will have at least one similar sensor, optical reflector, or means to report its position relative to the hand unit, and may have more than one of such to also report the orientation of the head.

These and other embodiments are discussed below with reference to FIGS. 1-4; however, those skilled in the art will readily appreciate that the detailed description given herein with respect to these figures is for explanatory purposes only and should not be construed as limiting.

FIG. 1 shows a perspective view of exemplary video game simulation controller system 100 suitable for use with the described embodiments. Controller system 100 can include hand-held controller 102. Hand-held controller 102 can take the form of handlebar housing 104 which generally resembles motorcycle handlebars. Housing 104 can include various controls arranged to replicate the hand controls of a typical motorcycle. In some embodiments housing 104 can include means for fixing hand-held controller in a fixed location such as clamps, legs, or weights. In certain embodiments, housing 104 can take the form of motorcycle handlebars. For example, housing 104 can include throttle 106 and first brake 108 on a first side or right handlebar of housing 104. Housing 104 can also include gear clutch 110 on a second side or left handlebar of housing 104. Throttle 106 and brake 108 can also include rotational sensors, pedal sensors, pressure sensors, on/off sensors, and binary sensors for measuring user input.

Hand-held controller 102 can also include sensor 120 for measuring steering angle 122. Sensor 120 can take the form of a rotational sensor as depicted. Controller system 100 additionally includes head tracker 130 for measuring positional location 132. In some embodiments head tracker 130 can take the form of a helmet. Head tracker 130 can also take the form of a commercially available motion tracker. Head tracker can be attached to a user's head by a head band or a head strap. In other embodiments positional location 132 can take of the form of a Cartesian coordinate with a reference frame or point of origin being hand-held controller 102; a Spherical coordinate with a reference frame or point of origin being hand-held controller 102; or any suitable coordinate system operable for measuring the location of head tracker 130 relative to hand-held controller 102. In certain embodiments the linear distance between head tracker 130 and positional location 132 can be measured.

In certain embodiments controller system 100 can also include additional motorcycle controls that are typically operable by a motorcycle riders feet. For example, hand-held controller 102 can include pedal housing 160. Although pedal housing is depicted in FIG. 1 as being a separate housing or a separate controller than hand-held controller 102, pedal housing 160 can also take the form of an indivisible part of hand-held controller 102. For example, hand-held controller and pedal housing 160 can take the form of an arcade machine type housing. Pedal housing 160 can include gear selector 162 and second brake 164. Pedal housing 160 and gear selector 162 can also include rotational sensors, pedal sensors, pressure sensors, on/off sensors, and binary sensors for measuring user input. Gear selector 162 and second brake 164 can take the form of pedals. In other embodiments, pedal housing 160 can be omitted and gear selector 162 and second brake 164 can be located on handlebar housing 104.

In an exemplary embodiment, controller system 100 can output steering angle 122 and positional location 132. In some embodiments, positional location 132 can be utilized to determine an effective lean angle of a motorcycle. For example, positional location 132 can be utilized to determine a center of gravity of a motorcycle rider. The center of gravity of the motorcycle rider can then be combined with the center of gravity of the motorcycle to determine the effective lean angle. The effective lean angle can then be combined with the steering angle to determine an effective steering angle. In some embodiments the outputs of first brake 108, second brake 164, and throttle 106 can also be utilized to determine the effective lean angle.

Figure 2:
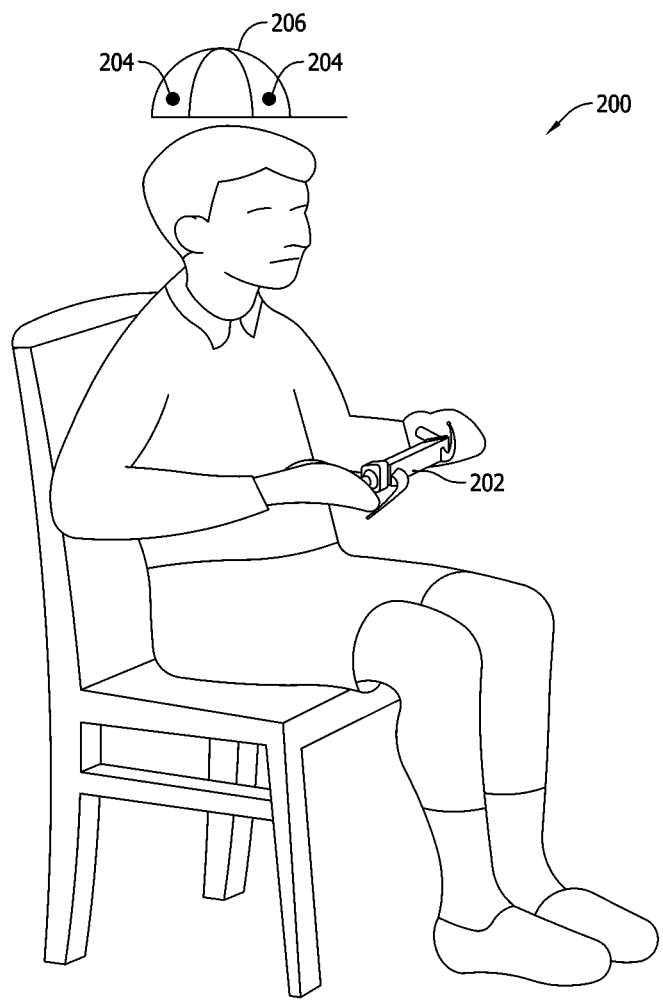
FIG. 2 depicts a side view of a video game simulation controller system utilizing commercial off the shelf parts.

FIG. 2 shows a side view of video game simulation control system 200. While control system 100 may be seen by those skilled in the art as utilizing bespoke components or components adapted or designed for a specific purpose, control system 200 can be seen as utilizing commercially available, off the shelf motion controller components.

Control system 200 includes hand-held controller 202 and head unit 204. Controller 202 measures an angular variable and a relative location between controller 202 and head unit 204. Alternately, head unit 204 can measure the angular variable and relative location. Head unit 204 can be attached to a user's head as depicted in FIG. 2. In some embodiments the attachment method can take the form of head band 206. In other embodiments either both or one of hand-held controller 202 and head unit 204 can take the form of any number of commercially available motion controllers. The commercially available motion controller must include a positional sensor or at least be capable of measuring an angle of tilt and a distance from one commercially available motion controller to another commercially available motion controller. For example, the commercially available motion controllers can include a gyroscope, an inertial measurement unit, or an accelerometer. Examples of suitable commercially available motion controllers include: a WIIMOTE, DUALSHOCK type controller, XBOX type controller, or a smartphone.

Figure 3A:
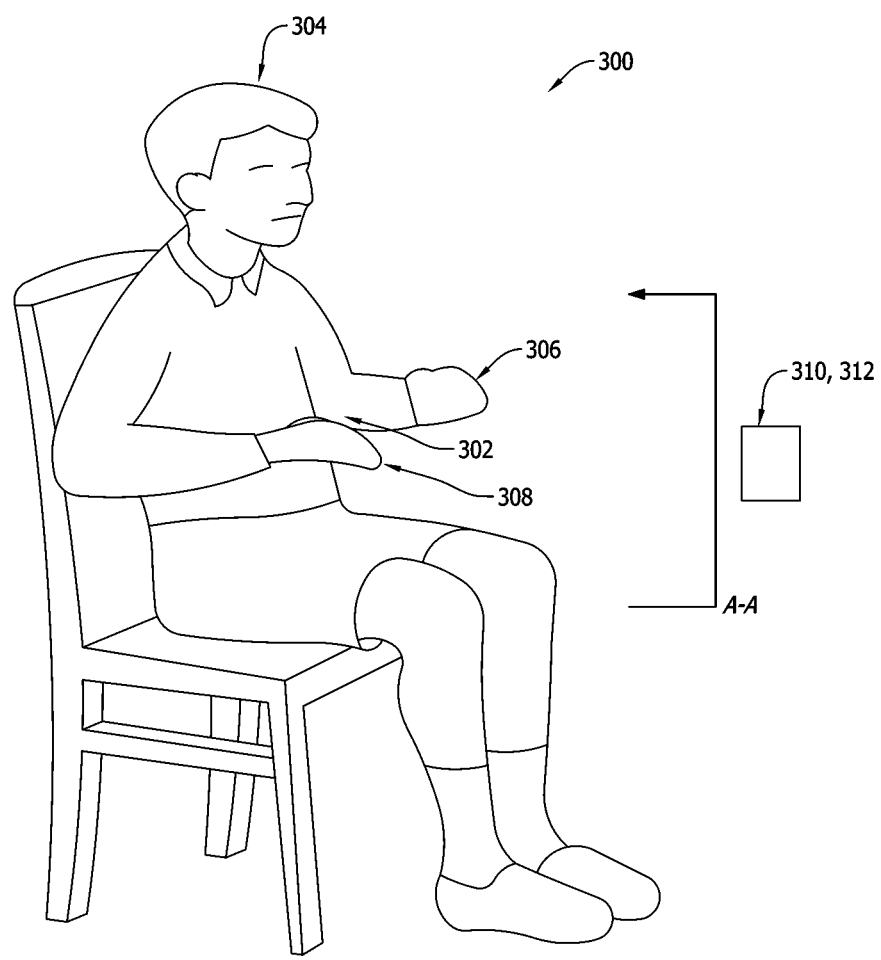
FIG. 3A depicts a side view of a video game simulation controller system utilizing computer vision techniques.

FIG. 3A shows a side view of video game simulation control system 300. While control system 100 may be seen by those skilled in the art as utilizing highly specialized components and control system 200 as utilizing general use motion controller components, control system 300 can be seen as utilizing general purpose computer vision components.

Control system 300 can include handlebar point of interest 302 and head point of interest 304. In some embodiments handlebar point of interest 302 can correspond to the average point between left hand point of interest 306 and right hand point of interest 308. For example, points of interest 306 and 308 can correspond to a user's left hand and right hand. In other embodiments points of interest 306 and 308 can be located on a handlebar housing where the prop includes reflective material or an optical pattern to facilitate detection. Head point of interest 304 can correspond to the user's head. In some embodiments head point of interest 304 can take the form of a head band including reflective material or an optical pattern to facilitate detection. Control system 300 can also include optical sensor 310 for keeping track of points of interest 302, 304, 306, and 308. In some embodiments optical sensor 310 can take the form of a hand-held controller and a helmet unit located on points of interest 302 and 304. The hand-held controller and the helmet unit can also utilize light source 312 to determine the location of points of interest 302 and 304. For example, light source 312 can take the form of one or more infrared, visual, or radio-frequency sources of light.

Figure 3B:
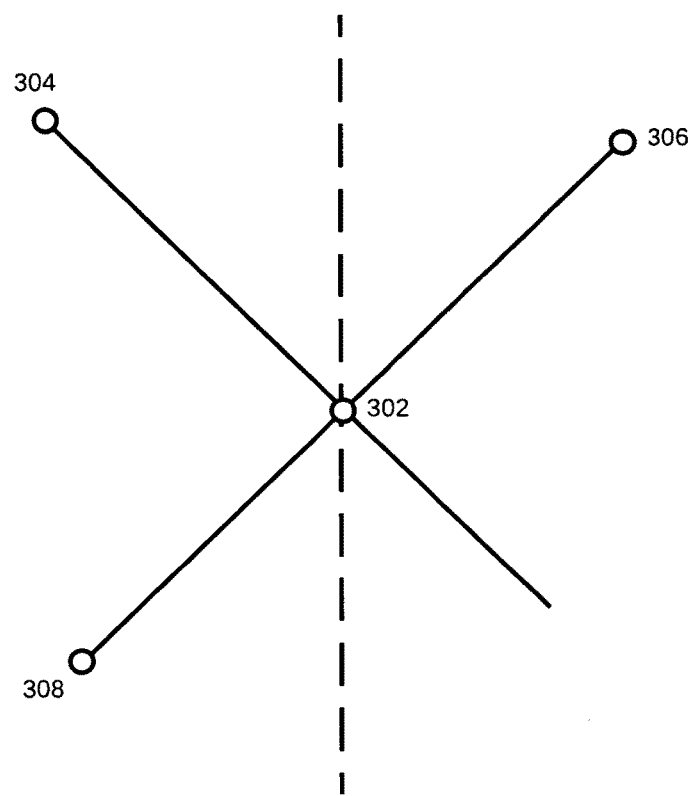
FIG. 3B depicts frontal view A-A of the video game simulation controller system utilizing computer vision techniques.

FIG. 3B shows frontal view A-A of the user and points of interest. Optical sensor 310 can measure angles 314 and 316. Angle 314 can correspond to the angle of a desired input by the user. For example, angle 314 can be a desired handlebar turn angle. Angle 316 can directly correspond to a desired lean angle by the user. For example, angle 316 can be the desired angle of lean for a virtual motorcycle, the desired angle of lean multiplied by a constant, or the desired angle of lean as an input to the following formula:

$$\lambda = \iint f(N_f) + \iint g(\sigma) + \iint h(A) + \int g(\sigma),$$

where $\lambda$ is the lean angle, $N_f$ is a torque applied to the wheels of the motorcycle, and $\sigma$ is the steering input angle.

One mode of use for control system 300 can be when the user desires to perform a countersteer. A countersteer control technique can be accomplished when the handlebar turn angle such as angle 314 is biased away from a desired turn and the desired lean angle such as angle 316 is biased into the desired turn. For example, if the user desired to make a right hand turn, angle 314 would be positive and angle 316 would be negative. If the user desired to make a left hand turn, angle 314 would be negative and angle 316 would be positive. In this way the technique of countersteering can be replicated.

Figure 4:
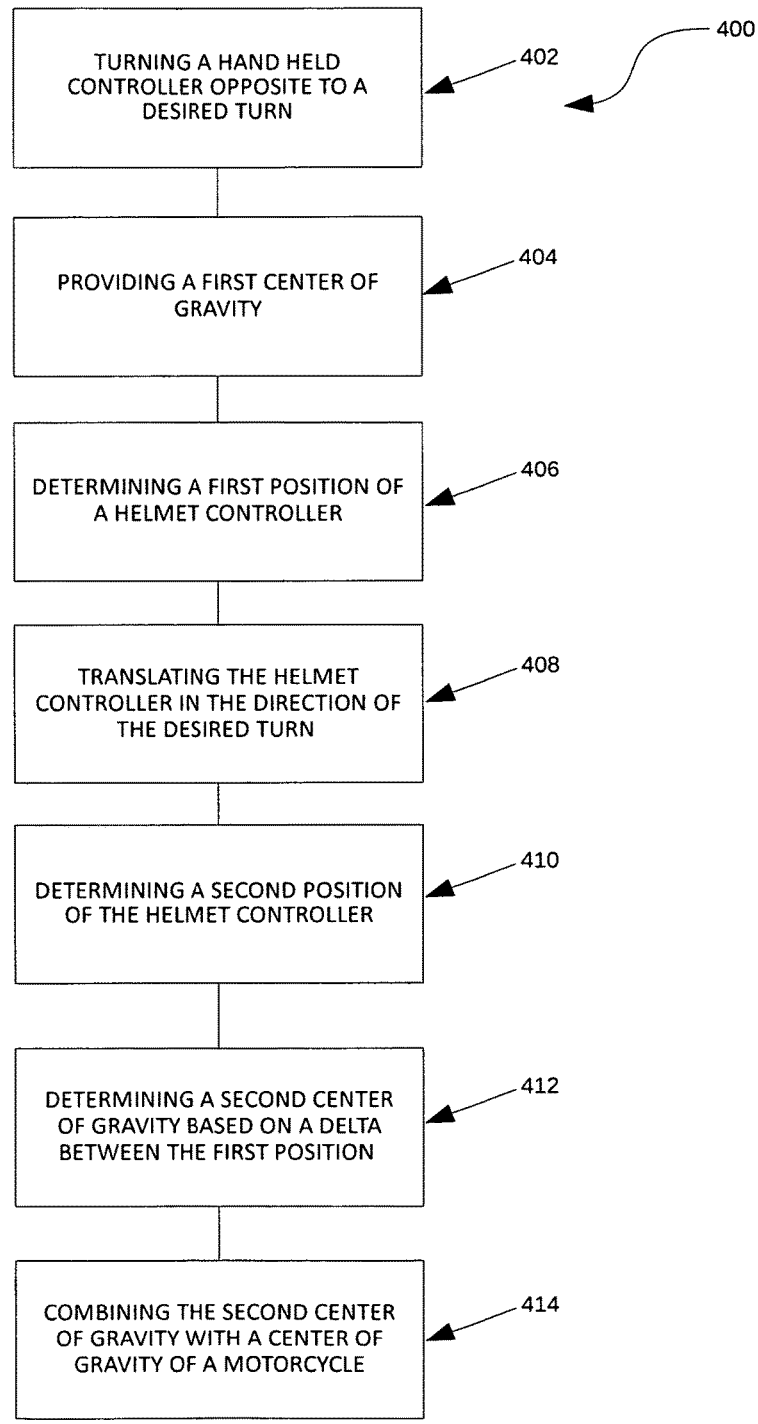
FIG. 4 depicts a flow diagram representing a method for controlling a video game simulation.

FIG. 4 illustrates a flow chart depicting control method 400 for utilizing a video game controller system. Those skilled in the art should be readily aware that method 400 is intended to simulate the motorcycle control technique known as countersteering. Generally, countersteering involves explicitly turning the handlebars of a motorcycle in a direction opposite to a desired turn in order to make the motorcycle lean in a desired angle.

As shown, countersteering a motorcycle video game simulation can be accomplished with control method 400. A user can initiate a desired countersteer operation first by performing step 402 which involves turning a hand-held controller opposite to a desired turn. Step 402 can be accomplished by the user initiating a countersteer using hand-held controller 102 wherein controller 102 outputs steering angle 122. Steering angle 122 can be a steering angle counter to the user's desired steering angle. The video game can then provide a first center of gravity as in step 404. The first center of gravity can be the center of gravity of a motorcycle rider. In some embodiments the magnitude of the center of gravity can be input by the user. For example, the user can input their own weight. After providing a first center of gravity, the video game can then determine a first position of a helmet controller as in step 406. In some embodiments the helmet controller can take the form of head tracker 130.

Simultaneous to or immediately after step 402, the user can execute step 408. In step 408, the helmet controller can be translated in the direction of the desired turn. In some embodiments, the helmet controller can take the form of a helmet that is worn by the user. The user can move the user's head which corresponds to the helmet controller in a direction having at least one vector parallel to the desired turn. In some embodiments, the user can be in a neutral position prior to step 408 and in a position leaning opposite to the desired turn after executing step 408. After step 408, the helmet controller would have moved from the first position to the second position. After the helmet controller moves from the first position to the second position the video game can then determine a second center of gravity based on a delta between the first position and the second position as in step 412.

For example, the first center of gravity can correspond to a motorcycle rider neutrally balanced on a motorcycle translating in a forward direction. The second center of gravity can correspond to the motorcycle rider leaning in a direction oblique to the center axis of the motorcycle. The second center of gravity can then be combined with the center of gravity of the motorcycle as in step 414 to generate a center of gravity that would approximate the center of gravity of a motorcycle with a motorcycle rider leaning over the side of a motorcycle. In some embodiments utilizing the combined center of gravity with a physics model in order to determine a level of traction on a first or front wheel of the motorcycle and another level of traction on a second or rear wheel of a motorcycle may be desirable. Those skilled in the art should appreciate that method 400 can be repeated a number of times in a short period of time in order to dynamically change a lean angle. If so desired, a user may utilize only method 400 and in particular step 408 to control a motorcycle. For example, at low speeds, user may want to steer only with head movements and no movements of the hand-held controller.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A motorcycle video game controller comprising:
   a hand-held controller that measures an input steering angle; and
   a helmet controller that measures a positional location wherein the positional location is the relative location of the head tracker to the hand-held controller,
   wherein the simulation utilizes the positional location of the helmet controller to determine an effective center of gravity and utilizes said center of gravity to determine a level of traction on at least one of the wheels of the motorcycle.

2. The game controller of claim 1, the hand-held controller further comprising:
   a first housing resembling handlebars comprising:
      a throttle,
      a first brake actuator, and
      a rotational sensor that detects a rotation of the handlebars; and
   a second housing comprising:
      a gear selector, and
      a second brake actuator.

3. The game controller of claim 2 wherein at least one of the throttle and first brake actuators are rotational sensors, and at least one of the gear selector and second brake actuator are pedal sensors.

4. The game controller of claim 3 wherein the first housing and the second housing are two or more sections of a single arcade video game simulation unit.

5. The game controller of claim 1, wherein the helmet controller further comprises a commercially available motion controller, the motion controller comprising:
   a gyroscope and an accelerometer, or
   an inertial measurement unit.

6. The game controller of claim 1, wherein the positional location is perpendicular to the track of the motorcycle.

7. The game controller of claim 2, wherein the pedal sensors further comprise rotational sensors, pressure sensors, or binary sensors.

8. The game controller of claim 1, wherein the helmet controller further comprises a first reflective material or a regular pattern for facilitating detection by an optical sensor said reflective material or regular pattern corresponding to a plurality of points of interest readable by the optical sensor.

9. The game controller of claim 1 wherein the helmet controller further comprises a head attachment strap.

10. A method of controlling a motorcycle video game simulation comprising:
    turning a hand-held controller opposite the direction to a desired turn,
    providing a first center of gravity related to the center of gravity of a motorcycle,
    determining a first position of a helmet controller,
    translating the helmet controller in the direction of the desired turn,
    determining a second position of the helmet controller,
    determining a second center of gravity based on a delta between the first position and the second position,
    combining the second center of gravity with the first center of gravity,
    utilizing the combined first and second centers of gravity to determine a level of traction on one of the wheels of the motorcycle.

11. The method of controlling a video game simulation of claim 10 further comprising the step of:
    combining the center of gravity input with the center of gravity of a reference vehicle produce a combined center of gravity.

12. The method of controlling a video game simulation of claim 11 further comprising the step of:
    combining the combined center of gravity with a physics model of the motorcycle in motion to determine a traction on a front or rear wheel of the motorcycle.

13. The method of controlling a video game simulation of claim 12 wherein the physics model utilizes the formula:

$$\lambda = \iint f(N_f) + \iint g(\sigma) + \iint h(\lambda) + f_g(\sigma).$$

14. The method of controlling a video game simulation of claim 13 further comprising the step of:
    repeating the entire method in order to dynamically change the lean angle of the motorcycle.

15. The game controller of claim 1, wherein the simulation further utilizes said center of gravity to determine a first level of traction on the front wheel of the motorcycle, a second level of traction on the rear wheel of the motorcycle, and each of the first level and the second level of traction is different.

16. The game controller of claim 6, wherein the simulation further utilizes said center of gravity to determine a gradient of traction on at least one of the wheels, said gradient varying in a perpendicular direction to the track of the motorcycle.

17. The game controller of claim 1, wherein the simulation further utilizes said center of gravity to determine a gradient of traction on at least one of the wheels, said gradient varying in a parallel direction to the track of the motorcycle.

18. The method of controlling a video game simulation of claim 10, further comprising the step of utilizing the combined first and second centers of gravity to determine a first level of traction on the front wheel of the motorcycle, a second level of traction on the rear wheel of the motorcycle, and each of the first level and the second level of traction is different.

19. The method of controlling a video game simulation of claim 10, wherein the level of traction is a gradient of traction that varies in a perpendicular direction to the track of the motorcycle in at least one of the wheels.

20. The method of controlling a video game simulation of claim 10, wherein the level of traction is a gradient of traction that varies in a normal direction to the track of the motorcycle in at least one of the wheels.

* * * * *